Sept. 14, 1965 R. C. BRACKETT 3,206,076
TRAILER CONSTRUCTION
Filed April 3, 1964 2 Sheets-Sheet 1
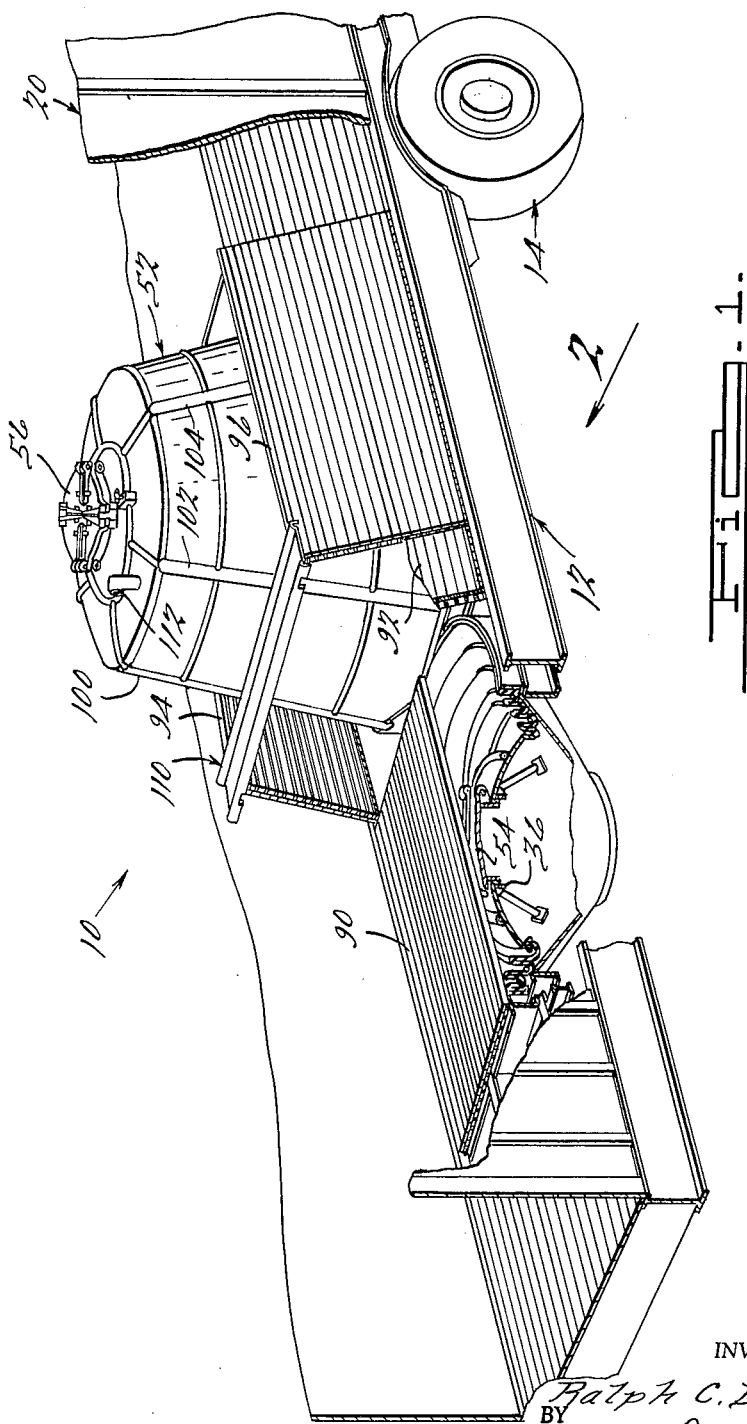
INVENTOR.
Ralph C. Brackett.
BY Harness, Dickey & Pierce.
ATTORNEYS.

Sept. 14, 1965  R. C. BRACKETT  3,206,076
TRAILER CONSTRUCTION
Filed April 3, 1964  2 Sheets-Sheet 2
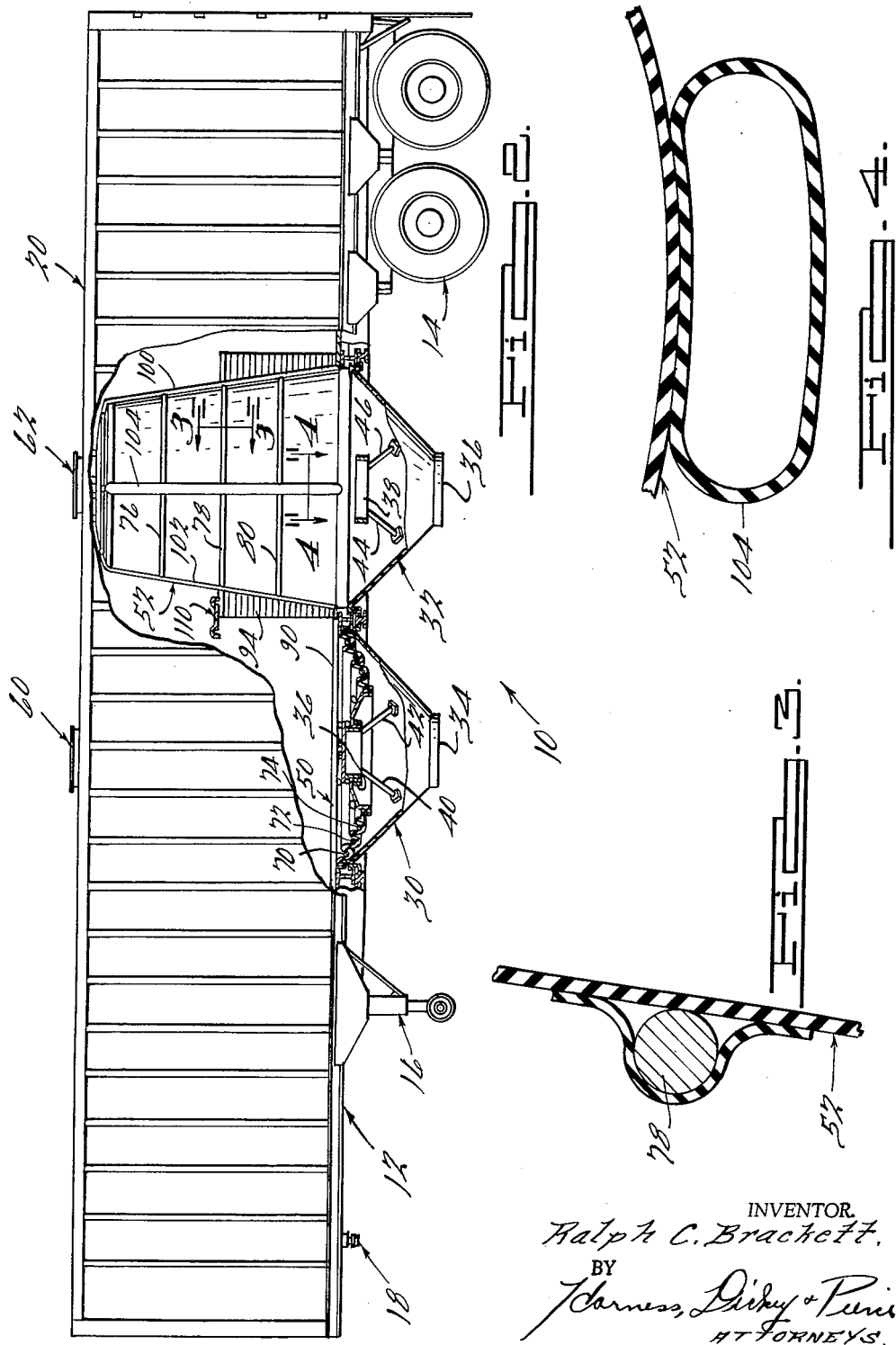
INVENTOR.
Ralph C. Brackett.
BY
Harness, Dickey & Pierce
ATTORNEYS.

3,206,076
TRAILER CONSTRUCTION
Ralph C. Brackett, Fresno, Calif., assignor to Fruehauf Corporation, Detroit, Mich., a corporation of Michigan
Filed Apr. 3, 1964, Ser. No. 357,118
6 Claims. (Cl. 222—105)

This invention relates generally to heavy duty over-the-road trucks and trailer and more particularly to an improved multipurpose over-the-road truck or trailer that is convertible between a conventional flat bed configuration and a hopper configuration for the transportation of liquids, comminuted materials, and the like.

There has long been a need for a satisfactory heavy duty over-the-road vehicle capable of being converted from the conventional flat bed configuration to a hopper type vehicle capable of carrying liquids or comminuted materials. Convertible flat bed trailers with folding side walls have heretofore been proposed. However, such vehicles are not totally satisfactory since leaks ultimately develop therein and they are impractical for carrying liquids. Furthermore, no vehicle has heretofore been offered to the shipping industry having an integral hopper which, when the trailer is in the flat bed or van configuration, is totally collapsed so as to maximize the efficiency of the trailer.

The foregoing problem is solved, in accordance with the instant invention by a heavy duty trailer having a pair of inflatable hoppers therein for the acceptance of liquids of comminuted materials. In the inflated condition the hoppers extend upwardly from the floor of the trailer so that the liquid or comminuted materials can be loaded thereinto from the top. Alternatively, the filling of the hoppers with a liquid can be utilized to aid in elevation thereof. The floor of the trailer is provided with a pair of truncated conical discharge hoppers with conventional gates at the lower ends thereof for the discharge of materials carried therein. The hoppers are of relatively tough wear-resistant flexible material so as to be fully collapsible within the truncated conical hoppers thereby to completely underlie the floor of the trailer when it is in the flat bed or van configuration. The hopper is biased to the upstanding condition by external high pressure tubes and held in this condition by said tubes in conjunction with a plurality of peripheral supporting rings. Internal pressurization can also be utilized to effect erection.

Accordingly, one object of the instant invention is an improved heavy duty over-the-road vehicle that is convertible from a flat bed or can configuration to a hopper configuration.

Another object is an improved collapsible hopper for a heavy duty over-the-road vehicle.

Another object is a collapsible hopper for a vehicle having a generally flat bed which is collapsible to a position beneath the bed of the vehicle.

Another object is an improved collapsible hopper construction.

Other objects and advantages of the instant invention will be apparent in the following specification, claims and drawings, wherein:

FIGURE 1 is a fragmentary perspective view of a heavy duty over-the-road trailer partially broken away for clarity;

FIG. 2 is a side elevational view taken in the direction of the arrow 2 of FIGURE 1;

FIG. 3 is a cross sectional view taken substantially along the line 3—3 of FIG. 2; and FIG. 4 is a cross sectional view taken substantially along the line 4—4 of FIG. 2.

Referring now to FIGURES 1 and 2 of the drawings, a convertible semitrailer 10, in accordance with an exemplary embodiment of the instant invention, comprises a frame or chassis 12 having a conventional wheel suspension 14, landing gear 16 and kingpin 18 secured thereto. The chassis 12 may have a conventional van 20 mounted thereon for the protection of goods when operating in the conventional configuration.

In accordance with the instant invention, the frame or chassis 12 of the trailer 10 is provided with a pair of longitudinally spaced, downwardly depending generally truncated conical hoppers 30 and 32 having gates 34 and 36 at the lower ends thereof, for the discharge of comminuted, liquid, or semi-liquid materials. The hoppers 30 and 32 are provided with a pair of internal support rings 36 and 38, respectively, that are supported on suitable pedestals or uprights some of which are shown and designated by the numerals 40, 42, 44 and 46. The rings 36 and 38 serve as supports for the collapsible containers, as will be described.

A pair of truncated conical collapsible containers 50 and 52 of tough resilient material, for example, rubber or rubber impregnated cloth, are superimposed over the hoppers 30 and 32 for the acceptance of liquids or comminuted materials when in the inflated or upwardly extending condition. The containers 50 and 52 are secured to the hoppers 30 and 32 by air-tight joints at the lower peripheries thereof and are provided with metal intake hatches 54 and 56 at the upper extremities thereof for the acceptance of materials. When the trailer 10 is provided with the van 20, the intake hoppers 54 and 56 are adapted to register with complementary access hatches 60 and 62 in the roof of the van 20 to facilitate filling of the containers 50 and 52 from the outside of the van 20.

The containers 50 and 52 are provided with a plurality of concentric metallic rings 70, 72, 74 and 76, 78 and 80, respectively, which aid in holding the containers 50 and 52 in a generally conical configuration when inflated as well as aiding in folding of the containers 50 and 52 upon deflation. As best seen in FIGURE 2 of the drawings, the rings 70, 72 and 74 initiate folds to insure that the container 50 is collapsed below the uppermost plane of the frame 12 of the trailer 10. It is also to be noted that the inlet hatches 54 and 56 on the containers 50 and 52 are seated on the rings 36 and 38, respectively, so as to be supported thereby and in turn support a plurality of foldable floor sections 90, 92, 94 and 96.

In accordance with another feature of the instant invention, the containers 50 and 52 are both biased to and stabilized in an upright or what may be termed an inflated condition by a plurality of vertically extending high pressure tubes some of which are shown and designated by the numerals 100, 102, 104 and 106. The exterior tubes 102, 104 and 106 are inflated from a source of high pressure air both to elevate the containers 50 and 52 to the inflated condition and retain the containers in the inflated condition for the acceptance of comminuted materials.

As best seen in FIGURE 1 of the drawings, the floor sections 92 and 94 are held in the upright condition by a catwalk 110 which serves as a catwalk for an operator to facilitate manual opening of the access doors 54 and 56.

As seen in FIG. 1, an inlet 112 is provided on the peripheral portion of the inlet hatch 56 for the acceptance of air to effect a blow-down of comminuted materials within the container 52. Blowdown is effected at pressures up to 15 p.s.i. for pneumatic or pressure differential discharge. Likewise, a reverse differential pressure will create a vacuum condition within the hopper causing it to rapidly collapse and fold in the proper manner. For example, by turning off the air supply to the bag and passing all the air across the face of the outlet valve, a ¾ lb. vacuum is created which forces the bag to fold at a much faster rate than its normal fall would permit. Alternatively, the inlet 112 can be used to fill the container 52 with fluids or to put air into the container 52 to aid in elevation thereof.

From the foregoing description it should be apparent that the convertible vehicle of the instant invention provides a flat bed having an unimpeded floor space or van having the full cube of a conventional over-the-road vehicle. This feature is achieved by the provision of the downwardly extending hoppers into which the containers are completely collapsible.

When the containers are inflated to the upright condition, they are capable of handling liquids, semi-liquids or comminuted materials rendering the vehicle a multi-purpose vehicle. The containers are relatively easily conditioned for the acceptance of comminuted materials by merely inflating the support tubes thereof which in combination with the support rings thereon substantially rigidify the containers. The support rings aid in initiating folds in the containers to facilitate nesting thereof. Support rings are provided in the hoppers which support the upper hatches of the containers in the collapsed condition which in turn support the foldable floor sections of the vehicle.

It is to be understood that the specific construction of the improved trailer construction herein disclosed and described is presented for the purpose of explanation and illustration and is not intended to indicate limits of the invention, the scope of which is defined by the following claims.

What is claimed is:

1. A heavy duty over-the-road vehicle comprising
a substantially flat bed,
a hopper depending from said flat bed,
a discharge gate at the lower end of said hopper,
means in said hopper for supporting a collapsible container,
a flexible collapsible container superimposed above said hopper and having a lower end portion sealably connected thereto,
a plurality of vertically extending tubes on the side walls of said container for the acceptance of high pressure fluid to bias said container to an upwardly extending condition relative to said flat bed,
an intake hatch on the top of said container for the acceptance of materials,
and a plurality of vertically spaced rings surrounding said container for reinforcing said container in the upright condition, the intake hatch on said container being supported by said supporting means when said container is collapsed into said hopper.

2. A heavy duty over-the-road vehicle comprising
a substantially flat bed,
a hopper depending from said flat bed,
a discharge gate at the lower end of said hopper,
a flexible collapsible container superimposed above said hopper and having a lower end portion sealably connected thereto,
means for biasing said container to an upwardly extending condition relative to said flat bed,
an intake hatch on the top of said container for the acceptance of materials,
and a plurality of vertically spaced rings surrounding said container for reinforcing said container in the upright condition each of said rings initiating a fold in said container upon collapse thereof into said hopper.

3. A heavy duty over-the-road vehicle comprising
a substantially flat bed,
a hopper depending from said flat bed,
a discharge gate at the lower end of said hopper,
a flexible collapsible container superimposed above said hopper and having a lower end portion sealably connected thereto,
a plurality of vertically extending tubes on the side walls of said container for the acceptance of high pressure fluid to bias said container to an upwardly extending condition relative to said flat bed,
an intake hatch on the top of said container for the acceptance of materials,
and a plurality of vertically spaced rings surrounding said container for reinforcing said container in the upright condition, said container being collapsible into said hopper below the plane of said flat bed.

4. A heavy duty over-the-road vehicle comprising
a substantially flat bed,
a downwardly convergent truncated conical hopper depending from said flat bed,
a discharge gate at the lower end of said hopper,
a flexible upwardly convergent truncated conical collapsible container superimposed above said hopper and having a lower end portion sealably connected thereto,
an intake hatch on the top of said container for the acceptance of materials,
and a plurality of vertically spaced rings surrounding said container for reinforcing said container in the upright condition, the diameter of said rings being progressively smaller vertically upwardly of said container whereby said rings initiate folds in said container and are collapsible into nesting relation.

5. A heavy duty over-the-road vehicle comprising
a substantially flat bed,
a hopper depending from said flat bed,
discharge means at the lower end of said hopper,
means in said hopper for supporting a collapsible container,
a flexible collapsible container superimposed above said hopper and having a lower end portion sealably connected thereto,
a plurality of vertically extending tubes on the side walls of said container for the acceptance of high pressure fluid to bias said container to an upwardly extending condition relative to said flat bed,
an intake hatch on the top of said container for the acceptance of materials,
means on said intake hatch for the acceptance of high pressure air to effect blowdown of materials within said containers,
and a plurality of vertically spaced rings surrounding said container for reinforcing said container in the upright condition, the intake hatch on said container being supported by said supporting means when said container is collapsed into said hopper.

6. A heavy duty over-the-road vehicle comprising
a substantially flat bed,
a hopper depending from said flat bed,
discharge means at the lower end of said hopper,
a flexible collapsible container superimposed above said hopper and having a lower end portion sealably connected thereto,
a plurality of vertically extending tubes on the side walls of said container for the acceptance of high pressure fluid to bias said container to an upwardly extending condition relative to said flat bed,
an intake hatch on the top of said container for the acceptance of materials,
a plurality of vertically spaced rings surrounding said container for reinforcing said container in the upright condition, said container being collapsible into said hopper below the plane of said flat bed, and
means for the introduction of fluid into said container.

References Cited by the Examiner

UNITED STATES PATENTS

| 2,712,797 | 7/55 | Woehrle et al. | 280—5 X |
|---|---|---|---|
| 3,025,073 | 3/62 | Hickman | 280—5 |
| 3,095,206 | 6/63 | Fresia et al. | 222—176 X |

LOUIS J. DEMBO, *Primary Examiner.*